United States Patent [19]

Suzuki et al.

[11] Patent Number: 5,417,936
[45] Date of Patent: May 23, 1995

[54] PLATE-TYPE OZONE GENERATOR

[75] Inventors: Shigeru Suzuki, Ashigarakami; Kenichi Fujihira, Tokyo, both of Japan

[73] Assignee: Nippon Ozone Co., Ltd., Tokyo, Japan

[21] Appl. No.: 55,244

[22] Filed: May 3, 1993

[30] Foreign Application Priority Data

Jun. 8, 1992 [JP] Japan .................. 4-171494
Feb. 4, 1993 [JP] Japan .................. 5-039301

[51] Int. Cl.$^6$ .............................. C01B 13/11
[52] U.S. Cl. ............... 422/186.07; 422/186; 422/907
[58] Field of Search ............ 422/186.07, 186, 907

[56] References Cited

U.S. PATENT DOCUMENTS

| | | | |
|---|---|---|---|
| 614,500 | 11/1898 | Ramage | 422/186 |
| 807,964 | 12/1905 | Rice | 422/186 |
| 811,364 | 1/1906 | Birtman | 422/186 |
| 1,218,817 | 3/1917 | Tennant | 422/186 |
| 2,822,327 | 2/1958 | Hammesfahr et al. | 422/186.07 |
| 4,654,199 | 3/1987 | Gloor et al. | 422/186.19 |
| 4,859,429 | 8/1989 | Nisenson | 422/186.13 |
| 4,892,713 | 1/1990 | Newman | 422/186.07 |
| 4,970,056 | 11/1990 | Wooten et al. | 422/186.07 |
| 5,316,639 | 5/1994 | Okazaki et al. | 204/192.12 |

FOREIGN PATENT DOCUMENTS 4-89303  3/1992  Japan .
4-89304  3/1992  Japan .

Primary Examiner—Donald P. Walsh
Assistant Examiner—Daniel Jenkins
Attorney, Agent, or Firm—Rogers & Killeen

[57] ABSTRACT

A plate-type ozone generator having a discharge cell including a box-shaped casing formed by using a dielectric of a quartz containing silicon dioxide having a purity of not less than 99.9%, a discharging gap defined by the interior of the casing, and a flow passage for a material gas defined in the discharging gap by a partition made of a quartz. A material gas inlet section and an ozone outlet section are provided on the discharge cell for communicating with the discharging gap. Each section has a quartz tube and a stainless steel tube joined together by a fused joint made of a covar glass and a covar alloy. The ozone generator does not employ a gasket made of an organic compound or the like, and is capable of stably generating high-concentration high-purity ozone for a long period of time without the risk of leakage.

4 Claims, 5 Drawing Sheets

61(71) CP  CA  S

PLATE-TYPE OZONE GENERATOR

BACKGROUND OF THE INVENTION

1. Field of the Invention

The present invention relates to improvement of a plate-type ozone generator for generating high-concentration high-purity ozone and, particularly, to a plate-type ozone generator which is capable of generating high-purity ozone that is not contaminated with metal while the apparatus eliminates the deterioration of a gasket used in a discharge cell for forming a discharging gap, and prevents the leakage of ozone, a harmful gas.

2. Description of the Related Art

Ozone, having a strong oxidizing ability, has long been used as an oxidant in chemical industries, and has been widely used to sterilize, deodorize and decolorize waters. In recent years, ozone has been widely used as a fine chemical material.

Various methods have been known for generating ozone. These include a method of radiating ultraviolet light to oxygen, and a method of electrolyzing water. In order to continuously generate a large quantity of ozone for industrial use, a method utilizing silent discharge is generally used. In this method, a discharging gap is formed between a pair of opposed electrodes, and a dielectric is provided on either the electrode surface of one of the electrodes or the electrode surfaces of both electrodes. An AC voltage is applied between the electrodes to cause continuous silent discharge between the electrodes through the dielectric while air or oxygen gas flows through the gap between the electrodes so that ozone is generated. One type of an ozone generator for industrial use is a plate-type ozone generator.

As shown in FIGS. 5 and 6, a conventional plate-type ozone generator includes a pair of discharge cells, each cell comprising either a high-voltage electrode 11 or an earthed electrode 12 and a dielectric layer 13 disposed on the electrode surface of the electrode 11 or 12. The discharge cells are opposed with a separator 14 therebetween, and formed into an integral structure by applying a silicone adhesive on the periphery of the cells, thereby forming a discharging gap 15. A radiator 16 is provided on the outer surface of each discharge cell. Further, holes 17 and 18, arranged in a diagonal direction, as shown in FIG. 6, open into the discharging gap 15 so that when air or oxygen is introduced through one of the holes 17 while silent discharge is caused, ozone can be generated and collected through the other hole 18. Normally, a silicone gasket 19 is disposed on the periphery of the mutually opposed surfaces of the discharge cells in order to form the discharging gap 15. However, the gasket, which is continuously exposed to high-concentration oxygen during operation, easily becomes impaired, and has its sealing performance deteriorated. Thus, the conventional ozone generator fails to provide satisfactory reliability and stability.

SUMMARY OF THE INVENTION

In view of the above-described problems, an object of the present invention is to provide a plate-type ozone generator in which no gasket, such as one made of an organic compound, is used, and which is capable of stably generating high-concentration high-purity ozone for a long period of time without the risk of leakage.

To this end, according to the present invention, a plate-type ozone generator comprises: a discharge cell which in turn comprises a box-shaped casing formed by using a dielectric of a quartz containing silicon dioxide having a purity of not less than 99.9%, a discharging gap defined by the interior of the casing, and paired electrodes disposed on an opposite pair of outer surfaces of the casing; a flow passage for a material gas defined by a partition made of a quartz and disposed in the discharging gap within the discharge cell; and a material gas inlet section and an ozone outlet section provided on the discharge cell for communicating with the discharging gap.

The present invention has been accomplished based on the following knowledge:

It is possible to overcome the above problems if a discharge cell is formed without using a gasket, that is, by using a dielectric of a quartz containing silicon dioxide having a purity of not less than 99.9%, and disposing a partition made of a quartz in the discharging gap so as to ensure an appropriate size of the discharging gap, and simultaneously if a high-voltage electrode and an earthed electrode are provided by forming electrically conductive coatings on respective ones of a pair of outer surfaces of the discharge cell while a material gas inlet section and an ozone outlet section are provided for communicating with the discharging gap;

It is possible to generate ozone very efficiently in addition to overcome the above problems if a pair of such discharge cells, each including paired electrodes and material gas inlet and ozone outlet sections as described above, are prepared, and the entire periphery of each cell is enclosed by an electrical insulator, and simultaneously if the pair of discharge cells are arranged symmetrically with respect to a heatsink disposed therebetween with each electrode on the outer side of a corresponding cell being contacted to a cooling chamber; and It is possible to prevent ozone leakage and to generate high-purity ozone free from contamination with metal if each of the inlet and outlet sections has a quartz tube joined to a stainless steel tube by a fused joint made of a covar glass and a covar alloy so as to achieve an agreement in coefficient of thermal expansion in order to prevent breakage due to thermal stress.

DESCRIPTION OF THE PREFERRED EMBODIMENTS

Embodiments of the present invention will be described with reference to the drawings.

Figure 1:
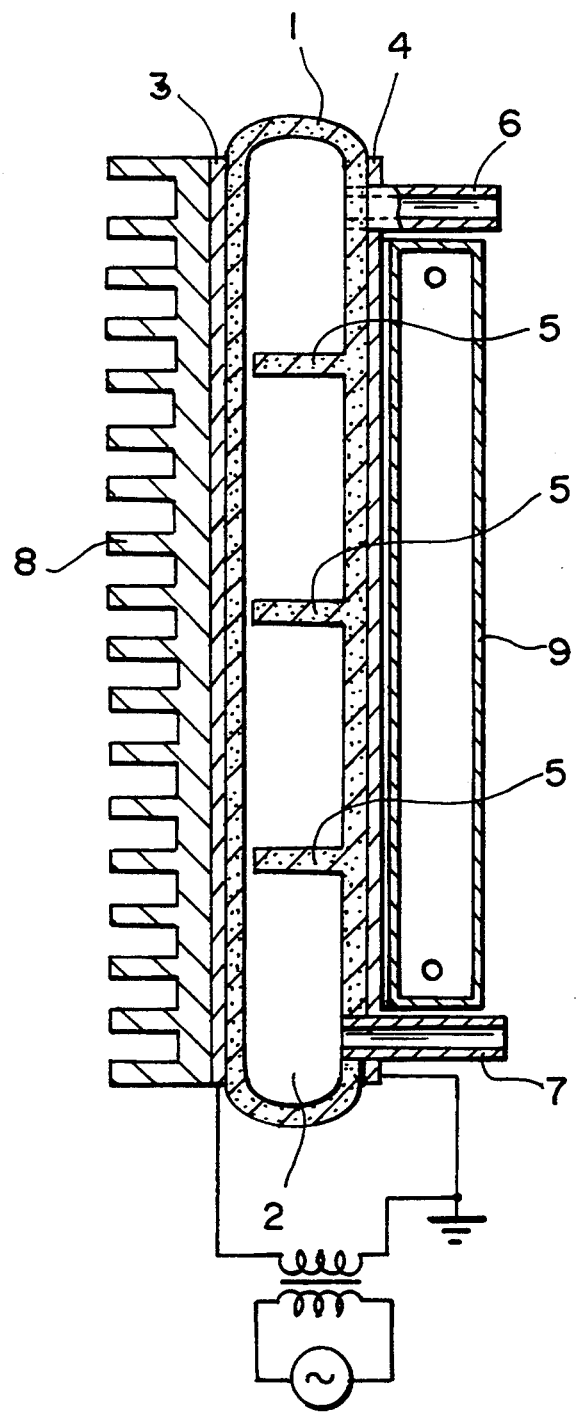
FIG. 1 is a vertical sectional view of the essential parts of a plate-type ozone generator according an embodiment of the present invention.
Figure 4:
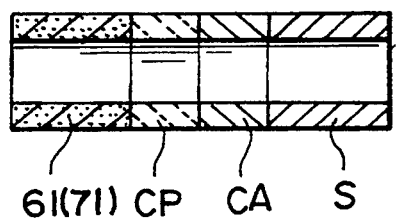
FIG. 4 is a sectional view showing details of a material gas inlet pipe and an ozone outlet pipe.
Figure 5:
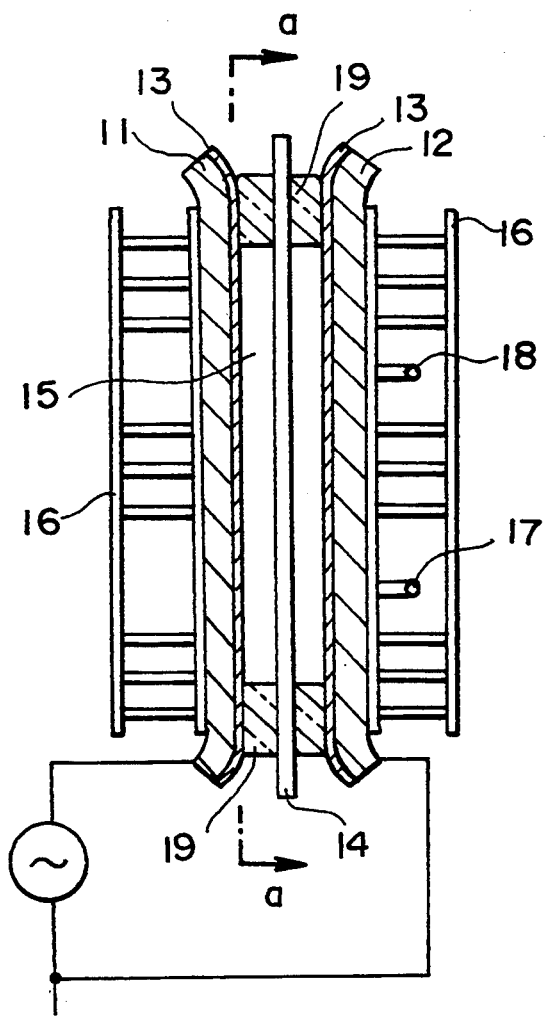
FIG. 5 is a vertical sectional view of a conventional ozone generator.
Figure 6:
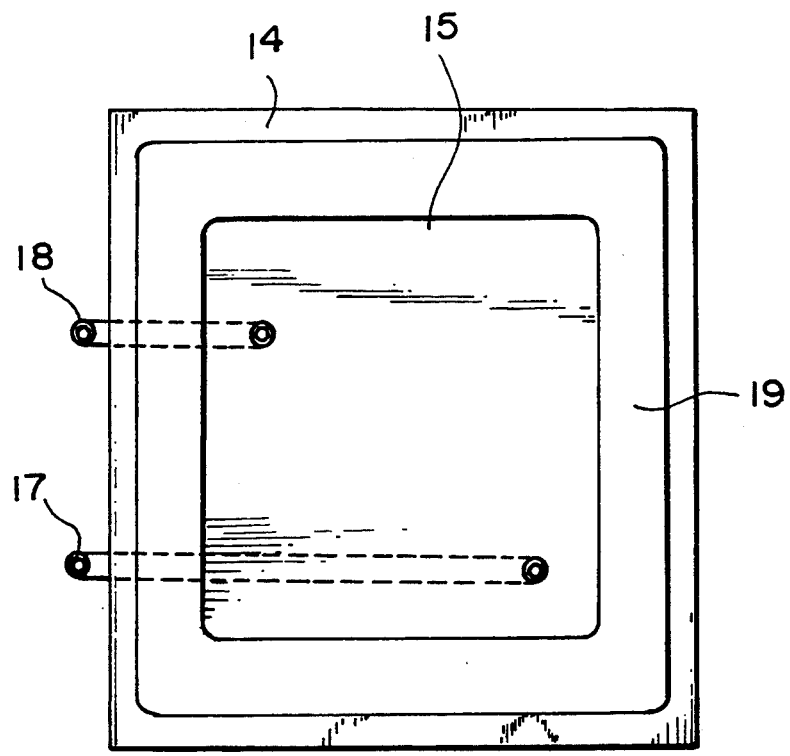
FIG. 6 is a sectional view taken along the line a—a shown in FIG. 5.

FIG. 1 shows, in a vertical sectional view, an ozone generator according to a first embodiment of the present invention. Referring to the drawing, the generator includes a discharge cell 1 having a box-shaped casing formed by using a dielectric of a quartz containing silicon dioxide having a purity of not less than 99.9%. The inside of the casing defines a discharging gap 2 of the cell 1. The cell 1 also has a high-voltage electrode 3 and an earthed electrode 4, each electrode being provided by forming an electrically conductive coating on one of an opposite pair of outer surfaces of the casing. A plurality of partition walls 5, made of a quartz, are disposed in the discharging gap 2 so as to define a flow passage through which a material gas can flow. A material gas inlet pipe 6 and an ozone outlet pipe 7, capable of communicating with the discharging gap 2, are provided on the same side of the discharge cell 1 as the earthed electrode 4. As shown in FIG. 4, each pipe 6 or 7 has a quartz tube 61 or 71 fixed to the discharge cell 1, and a stainless tube S joined to the quartz tube by a fused joint comprising a covar glass tube CP and a covar alloy tube CA. The ozone generator further includes a heatsink 8 contacting the high-voltage electrode 3, and a cooling chamber 9 contacting the earthed electrode 4.

When a voltage is applied between the electrodes 3 and 4 while air or oxygen is introduced through the material gas inlet pipe 6 into the discharging gap 2, silent discharge takes place to generate ozone. Generated ozone is discharged through the ozone outlet pipe 7, and conveyed through a pipe system to a place where ozone is needed.

The ozone generator according to the present invention is able to provide substantial effect even when the material gas inlet pipe 6 and the ozone outlet pipe 7 are replaced by Teflon couplings made of a conventional pipe material having a good leakage-prevention characteristic and ozone-resistant properties. However, the use of the above pipes 6 and 7 enables the apparatus to provide better effects. Specifically, when the conventional pipe material is used, the gas discharge speed is $1 \times 10^{-5}$ pa·m$^3$/sec or thereabout. In contrast, when the material gas inlet pipe 6 and the ozone outlet pipe 7 are used, the gas discharge speed is approximately $1 \times 10^{-8}$ pa·m$^3$/sec. Thus, it is apparent that a greatly improved gas-tightness can be achieved.

Figure 2:
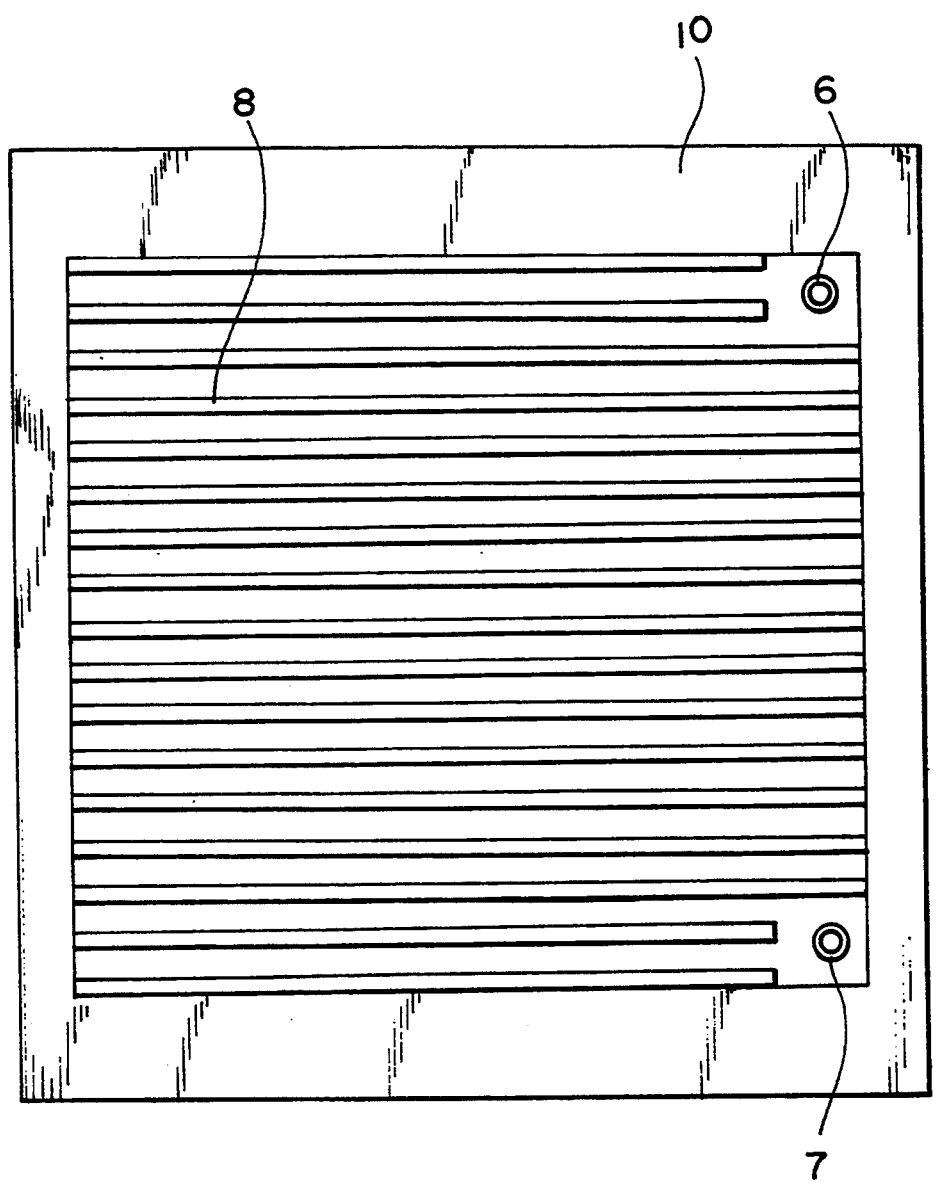
FIG. 2 is a front view of a plate-type ozone generator having a pair of discharge cells according to another embodiment of the present invention.
Figure 3:
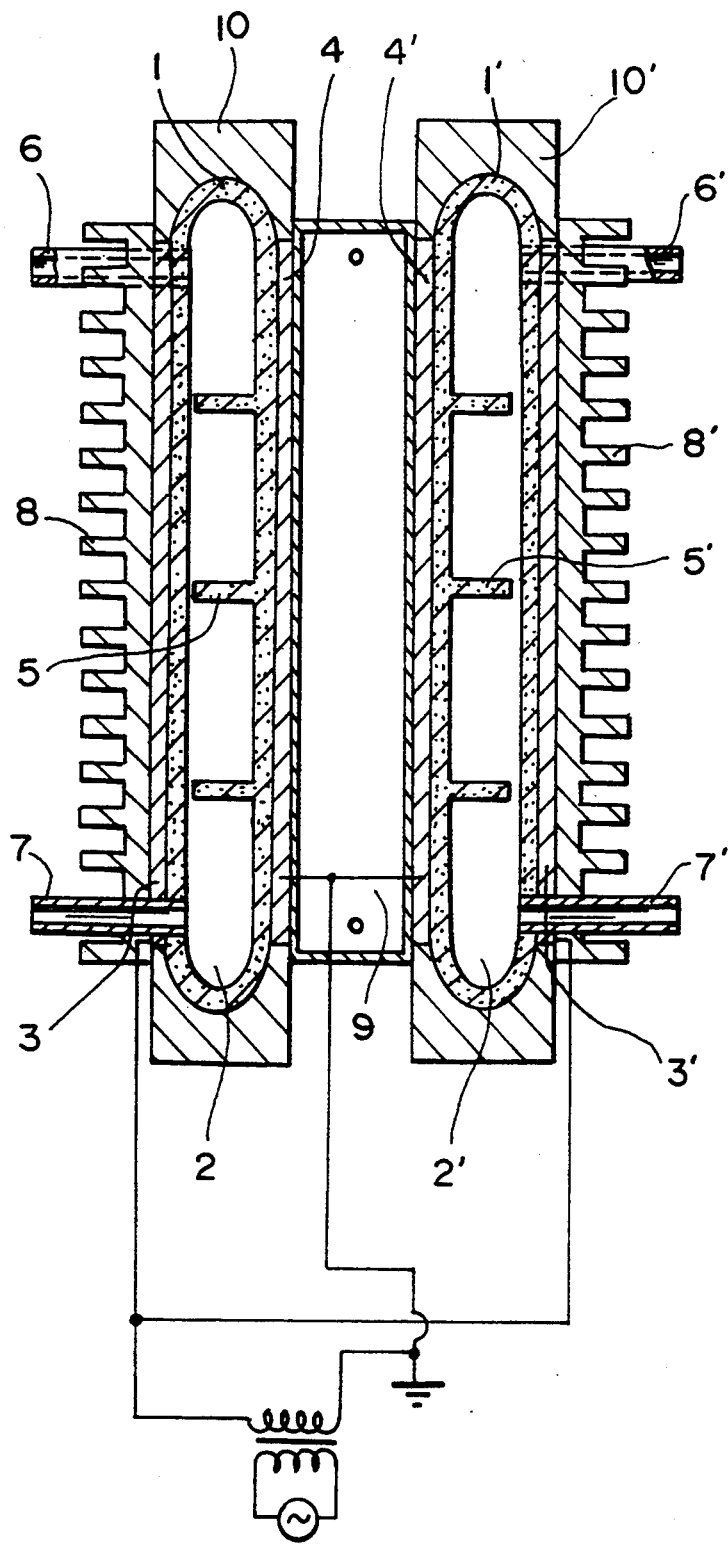
FIG. 3 is a vertical sectional view of the essential parts of the ozone generator shown in FIG. 2.

A second embodiment shown in FIGS. 2 and 3 is distinguished in that: a pair of discharge cells 1 and 1', each being the same as the above-described discharge cell, are used, and the entire periphery of each cell 1 or 1' is enclosed by an electrically insulating material 10 or 10' for preventing discharge from edge portions of corresponding electrodes 3 and 3', or 4 and 4'; and the discharge cells 1 and 1' are arranged symmetrically with respect to a cooling chamber 9 disposed therebetween, with the earthed electrode 4 or 4' of each cell 1 or 1', which is at an inner position of the corresponding cell, being disposed in contact with the heatsink 8 and the high-voltage elctrode 3 or 3', which is at an outer position of the corresponding cell 1 or 1', being disposed in contact with a corresponding heatsink 8 or 8'. The other construction of the second embodiment is basically the same as that of the first embodiment. Reference numerals 5', 6' and 7' respectively denote a plurality of partition walls, a material gas inlet pipe, and an ozone outlet pipe of the discharge cell 1'.

The ozone generator according to the second embodiment having the discharge cells 1 and 1' is able to generate twice as much as ozone when compared to an apparatus having a single discharge cell 1. Thus, the apparatus according to the second embodiment may be suitably used as an ozone generator for the supply of ozone in semiconductor industries where much ozone is required.

As has been described above, because a discharge cell is formed comprising a casing formed by using a dielectric of a quartz containing high-purity silicon dioxide, and thus formed without using a gasket, and because a quartz partition is disposed in a discharging gap defined by the inside of the cell in order to ensure an appropriate size of the discharging gap and to make uniform the discharge reaction as well as the flow of a material gas within the discharge cell, it is possible to generate high-concentration ozone which is not contaminated with metal. If pipes for introducing a material gas and for discharging ozone each have a quartz tube disposed on the discharge cell for communication with the discharging gap, and a stainless steel tube joined to the quartz tube by a fused joint comprising a covar glass tube and a covar alloy tube, it is possible to greatly improve air-tightness, and hence, to stably generate high-concentration ozone free from metal contamination. When an ozone generator according to the present invention is used as an ozone supply source in semiconductor industries, it is possible to assure clean environment.

What is claimed is:

1. A plate-type ozone generator comprising: a discharge cell which in turn comprises a box-shaped casing formed by using a dielectric of a quartz containing silicon dioxide having a purity of not less than 99.9%, said casing comprising an interior surface and outer surfaces, a discharging gap defined by the interior surface of said casing, and paired electrodes disposed on an opposite pair of the outer surfaces of said casing; a flow passage for a material gas defined by said discharging gap within said discharge cell; and a material gas inlet section and an ozone outlet section provided on said discharge cell for communicating with said discharging gap.

2. A plate-type ozone generator comprising: a pair of discharge cells each of which comprises a box-shaped casing formed by using a dielectric of a quartz containing silicon dioxide having a purity of not less than 99.9%, said casing comprising an interior surface and outer surfaces, a discharging gap defined by the interior surface of said casing, a flow passage for a material gas defined by said discharging gap, and paired electrodes provided on an opposite pair of the outer surfaces of said casing by forming electrically conductive coatings on said outer surfaces, the entire periphery of said discharge cells being enclosed by an electrical insulator, said electrodes having electrode surfaces one of which is contacted to a surface of a heatsink and the other is contacted to a cooling chamber; and a material gas inlet section and an ozone outlet section provided on each of said discharge cells for communicating with a corresponding discharging gap.

3. A plate-type ozone generator according to claim 1, wherein each of said material inlet section and said ozone outlet section comprises a quartz tube, and a stainless steel tube joined to said quartz tube by a fused joint made of a covar glass and a covar alloy.

4. A plate-type ozone generator according to claim 2, wherein each of said material inlet section and said ozone outlet section comprises a quartz tube, and a stainless steel tube joined to said quartz tube by a fused joint made of a covar glass and a covar alloy.

* * * * *